US011126695B2

(12) United States Patent
Minami et al.

(10) Patent No.: US 11,126,695 B2
(45) Date of Patent: Sep. 21, 2021

(54) POLYMER DESIGN DEVICE, POLYMER DESIGN METHOD, AND NON-TRANSITORY RECORDING MEDIUM

(71) Applicant: SHOWA DENKO K.K., Tokyo (JP)

(72) Inventors: Takuya Minami, Tokyo (JP);
Yoshishige Okuno, Tokyo (JP);
Katsumi Murofushi, Tokyo (JP);
Toshio Fujita, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 149 days.

(21) Appl. No.: 16/666,643

(22) Filed: Oct. 29, 2019

(65) Prior Publication Data

US 2020/0142951 A1 May 7, 2020

(30) Foreign Application Priority Data

Nov. 2, 2018 (JP) .............................. JP2018-207577

(51) Int. Cl.
*G06F 17/18* (2006.01)
*G06N 20/00* (2019.01)

(52) U.S. Cl.
CPC ............. *G06F 17/18* (2013.01); *G06N 20/00* (2019.01)

(58) Field of Classification Search
CPC ................................. G06N 20/00; G06F 17/18
See application file for complete search history.

(56) References Cited

U.S. PATENT DOCUMENTS

| 6,687,621 B2 | 2/2004 | Schneiderman et al. |
| 2015/0310162 A1* | 10/2015 | Okuno .................... G16C 20/50 |
| | | 706/12 |
| 2018/0018408 A1* | 1/2018 | Matsumura ............ G16C 20/30 |

(Continued)

FOREIGN PATENT DOCUMENTS

| JP | H06-271823 | 9/1994 |
| JP | 2004-514902 | 5/2004 |

(Continued)

OTHER PUBLICATIONS

D. Rogers et al., "Extended-Connectivity Fingerprints" American Chemical Society, J. Chem. Info. Model., vol. 50, No. 5, 2010, pp. 742-754.

(Continued)

*Primary Examiner* — Bijan Mapar
(74) *Attorney, Agent, or Firm* — IPUSA, PLLC

(57) ABSTRACT

A polymer design device according to an embodiment of the present disclosure receives a requirement for a target physical property of a desired polymer, and acquires structural information of polymers. For each polymer corresponding to the acquired structural information, the polymer design device estimates physical property information of the polymer including a mean value and a standard deviation, based on the structural information of the polymer and a regression model, and calculates a score of the polymer based on the requirement for the target physical property and based on the mean value and the standard deviation. From among the acquired structural information of the polymers, the polymer design device selects at least one polymer as the desired polymer, based on the score of each of the polymers, and outputs information of the selected at least one polymer.

10 Claims, 8 Drawing Sheets

(56) References Cited

U.S. PATENT DOCUMENTS

2019/0310207 A1* 10/2019 Cardozo ............. C08L 23/0815
2020/0051671 A1* 2/2020 Maxson ................. G16C 20/70
2020/0082913 A1* 3/2020 Mir ........................ G06N 7/005

FOREIGN PATENT DOCUMENTS

| JP | 5946045 | 7/2016 |
|---|---|---|
| JP | 2018-010428 | 1/2018 |
| WO | 2008/116495 | 10/2008 |

OTHER PUBLICATIONS

International Search Report dated May 28, 2019 with respect to PCT/JP2019/008704.
Journal of Computer Aided Chemistry [online], 2009, vol. 10, [retrieval date May 15, 2019], Internet: <URL:https://www.stage.jst.go.jp/article/jcac/10/0/10_0_30/_article/-char/ja><DOI:10.2751/jcac.10.30>, pp. 30-37, (Goto, Shun et al., "Development of Predictive Models and Reverse Analysis Method for Polymer Design") with Partial English Trans.
Takuya Minami et al., "Number Density Descriptor on Extended-Connectivity Fingerprints Combined with Machine Learning Approaches for Predicting Polymer Properties" ADMAT.
Takuya Minami et al., "Number Density Descriptor on Extended-Connectivity Fingerprints Combined with Machine Learning Approaches for Predicting Polymer Properties" MRS Advances © 2018 Materials Research Society DOI: 10.1557/adv.2018.454 Downloaded from https://www.cambridge.org/core. IP address: 103.9.96.234, on May 22, 2018 at 08:40:49.
2018 MRS Spring Meeting & Exhibit Apr. 2-6, 2018 Phoenix, Arizona—Session Details.

* cited by examiner

FIG.5

POLYMER STRUCTURAL FORMULA/PHYSICAL PROPERTY DB — 331

| POLYMER NAME | STRUCTURAL FORMULA | REFRACTIVE INDEX | GLASS-TRANSITION TEMPERATURE | ... |
|---|---|---|---|---|
| poly(ethylene) | *CC* | 1.472 | ... | ... |
| poly(propylene) | *C(C)C* | 1.469 | ... | ... |
| poly(butene) | *C(C)C(C)* | 1.474 | ... | ... |
| poly(vinyl alcohol) | *C(O)C* | 1.546 | ... | ... |
| poly(ethyleneoxide) | *CCO* | 1.4638 | ... | ... |
| ... | ... | ... | ... | ... |

400

| POLYMER NAME | STRUCTURAL FORMULA | NUMBER OF ATOMS | ECFP | ... |
|---|---|---|---|---|
| poly(ethylene) | ... | ... | ... | ... |
| poly(propylene) | ... | ... | ... | ... |
| poly(butene) | ... | ... | ... | ... |
| poly(vinyl alcohol) | ... | ... | ... | ... |
| poly(ethyleneoxide) | ... | ... | ... | ... |
| ... | ... | ... | ... | ... |

FIG.8

|  | MEAN TRIAL COUNT |
|---|---|
| COMPARATIVE EXAMPLE | 198 |
| EXAMPLE 1 | 4.6 |
| EXAMPLE 2 | 24 |
| EXAMPLE 3 | 16 |
| EXAMPLE 4 | 17 |

POLYMER DESIGN DEVICE, POLYMER DESIGN METHOD, AND NON-TRANSITORY RECORDING MEDIUM

CROSS-REFERENCE TO RELATED APPLICATION

This patent application is based on and claims priority to Japanese Patent Application No. 2018-207577, filed on Nov. 2, 2018, the entire contents of which are incorporated herein by reference.

BACKGROUND OF THE INVENTION

1. Field of the Invention

The present disclosure relates to a polymer design device, a computer program for a polymer design device, and a polymer design method.

2. Description of the Related Art

Traditionally, development of new structures for functional materials has required identification of the structure of materials having desirable physical properties from among a large number of candidates. Therefore, the development of the structure of new functional materials has usually been time consuming and costly.

In recent years, attention has been paid to methods of designing materials having desired physical properties using machine learning. For example, a device for searching for new crystal structures that achieve a desired material function using a genetic algorithm has been described (Patent Document 1). In addition, a device for designing compounds that interact with proteins using a particle swarm optimization method or the like has been described (Patent Document 2).

In the past, however, polymer design has been performed by randomly selecting the polymer structure and searching for the polymer structure having the desired physical properties. Such unreliable experiments were very inefficient and could not efficiently predict the structure of the polymer with the desired physical properties.

The present disclosure has been made in view of the above points, and is intended to realize flexible control through deep reinforcement learning while ensuring a control characteristic of a controlled object.

RELATED-ART DOCUMENTS

Patent Documents

[Patent Document 1] Japanese Laid-open Patent Application Publication No. 2018-010428
[Patent Document 2] Japanese Patent No. 5946045

SUMMARY OF THE INVENTION

A polymer design device according to an embodiment of the present disclosure includes: a target physical property acquisition unit configured to receive a requirement for a target physical property of a desired polymer; a polymer structural formula acquisition unit configured to acquire structural information of polymers; a regression calculation unit configured to estimate, for each polymer corresponding to the structural information acquired by the polymer structural formula acquisition unit, physical property information of the polymer indicating a physical property of the polymer, based on the structural information of the polymer and based on a regression model representing a relationship between the structural information of the polymer and the physical property of the polymer, the physical property being a variable following a given probability distribution, and the physical property information including a mean value of the given probability distribution and a standard deviation of the given probability distribution. The polymer design device further includes a score evaluation unit configured, to calculate for each polymer corresponding to the structural information acquired by the polymer structural formula acquisition unit, a score of the polymer based on the requirement for the target physical property and based on the mean value and the standard deviation of the physical property of the polymer, to select, from among the structural information of the polymers acquired by the polymer structural formula acquisition unit, at least one polymer as the desired polymer, based on the score of each of the polymers, and to output information of the selected at least one polymer.

BRIEF DESCRIPTION OF THE DRAWINGS

FIG. 5 is a diagram illustrating an example of a data structure of a polymer structural formula/physical property DB;
FIG. 8 is a diagram illustrating an example of results of evaluation of a mean trial count.

DETAILED DESCRIPTION OF THE PREFERRED EMBODIMENTS

Hereinafter, an embodiment of the present invention will be described with reference to the drawings. Note that in the following descriptions and the drawings, elements having substantially identical features are given the same reference symbols and overlapping descriptions may be omitted.

[Example System Configuration]

Figure 1:
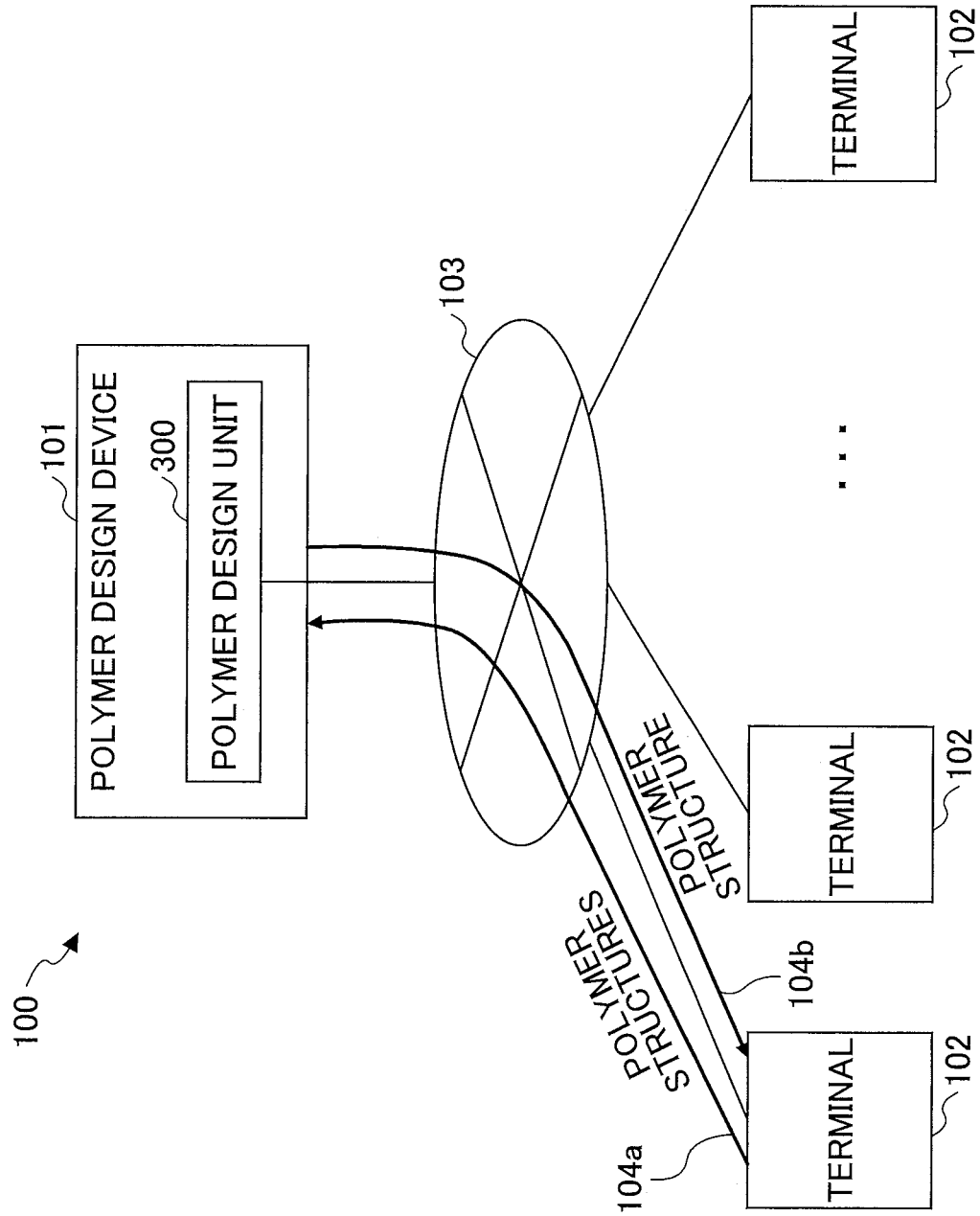
FIG. 1 is a diagram illustrating an example of the system architecture according to a present embodiment.

FIG. 1 is a diagram illustrating an example of system architecture according to the present embodiment. First, the example of the system architecture according to the present embodiment will be described. In FIG. 1, a system 100 includes a polymer design device 101 and one or more terminals 102. The polymer design device 101 and each of the terminals 102 can communicate via a network 103 of any type.

The polymer design device 101 is an information processing device (computer) including a polymer design unit 300 for predicting a structure of a polymer. In the polymer design device 101, the polymer design unit 300 creates a regression model (trained model) by performing machine learning using structures of polymers that are given in advance (each of the structures may be given, for example, in the form of a structural formula; hereinafter in the present embodiment, a structure of a polymer may be referred to as a "polymer structural formula") and data indicating physical properties (physical property values such as glass transition temperature, crystallization temperature, or refractive index) of the polymers. In addition, in the polymer design device 101, the polymer design unit 300 predicts, in response to receiving multiple polymer structures 104a (in a form of a structural formula, for example) from the terminal 102, physical property values and the standard deviations of the physical property values by using the regression model, and transmits a polymer structure 104b to be verified next (in a form of a structural formula, for example) to the terminal 102 based on those values (that is, the physical property value and the standard deviation thereof).

The terminal 102 is an information processing terminal (computer) used by a user. The terminal 102 accesses the polymer design device 101, and utilizes processing by the polymer design unit 300.

The configuration of the system 100 is not limited to the example of FIG. 1. For example, the polymer design device 101 may be used stand-alone. In this case, when multiple polymer structures 104a are input through operations of an input device by a user, a polymer structure 104b, which is expected to be the best among the polymer structures 104a, is output to a display device.

[Example Hardware Configuration of Polymer Design Device 101]

Figure 2:
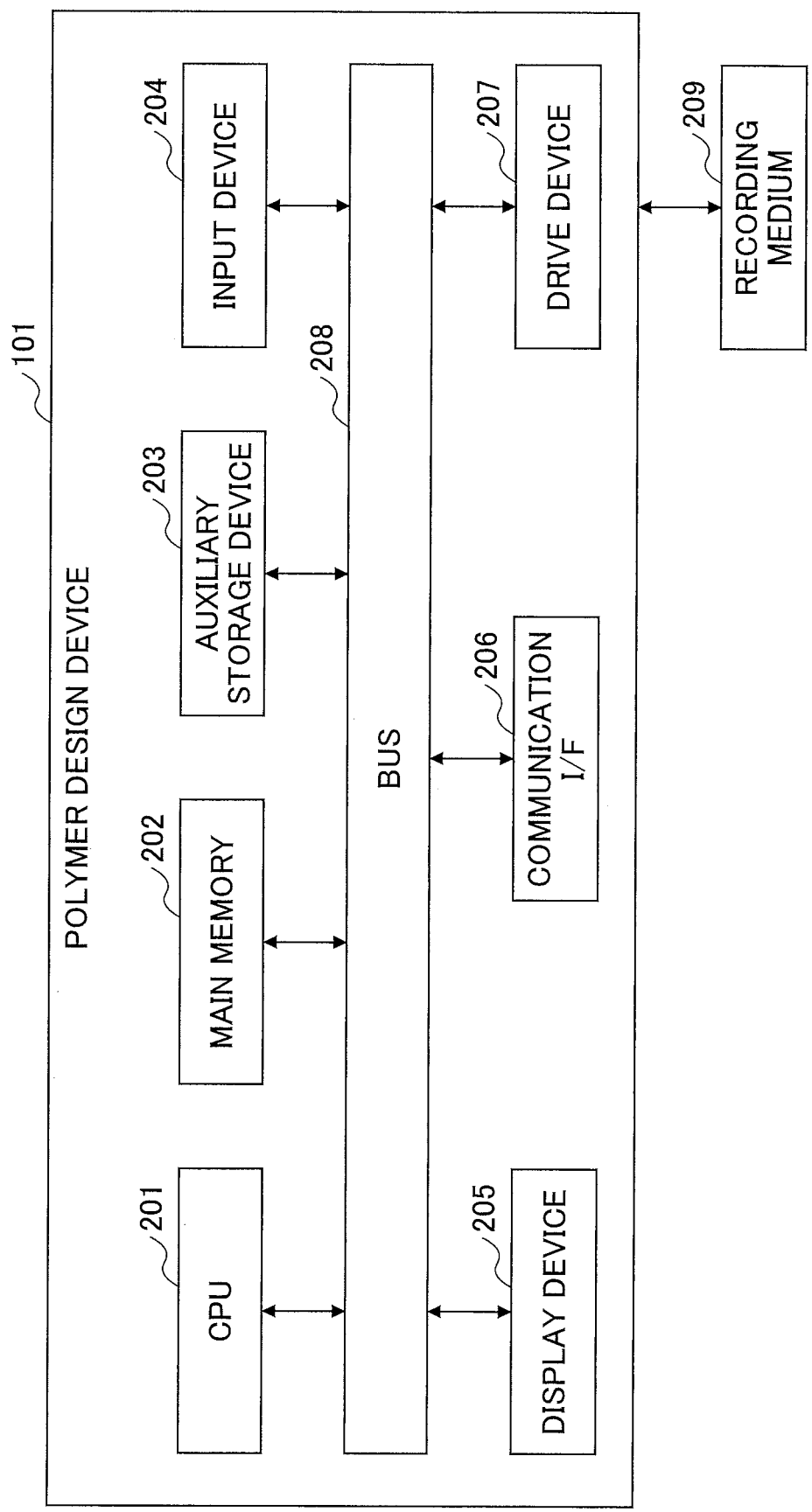
FIG. 2 is a diagram illustrating an example of the hardware configuration of a polymer design device.

FIG. 2 is a diagram illustrating an example of a hardware configuration of the polymer design device 101. The polymer design device 101 according to the present embodiment has the hardware configuration as illustrated in FIG. 2. In FIG. 2, the polymer design device 101 is an information processing device (computer). The polymer design device 101 includes a CPU (central processing unit) 201, a main memory 202, an auxiliary storage device 203, an input device 204, a display device 205, a communication interface (I/F) 206, and a drive device 207, each of which is interconnected via a bus 208.

The CPU 201 corresponds to a processor that controls the polymer design device 101 according to a program stored in the main memory 202.

The main memory 202 stores or temporarily retains a program executed by the CPU 201, data necessary for processing by the CPU 201, data obtained by the processing by the CPU 201, and the like. As the main memory 202, a RAM (Random Access Memory), a ROM (Read Only Memory), and the like may be used. As the auxiliary storage device 203, an HDD (hard disk drive) or the like may be used. The auxiliary storage device 203 stores data such as a program for executing various processes. A part of the programs stored in the auxiliary storage device 203 is loaded into the main memory 202, and is executed by the CPU 201, thereby realizing the various processes. Hereinafter, the main memory 202, the auxiliary storage device 203, and an external recording medium 209 accessible by the polymer design device 101 are collectively referred to as a "storage unit".

The input device 204 may be a mouse, keyboard, or the like, and is used by a user to input various information required for the processing performed by the polymer design device 101. The display device 205 displays various types of necessary information under control of the CPU 201. The input device 204 and the display device 205 may be an integrated human interface device, such as a touch panel.

The communication I/F 206 performs communication over a network such as a wired or wireless network. Communication performed by the communication I/F 206 is not limited to wireless or wired communication.

The drive device 207 interfaces the recording medium 209 (for example, a CD-ROM (Compact Disc Read-Only Memory) or the like) inserted in the drive device 207, with the polymer design device 101. A program that realizes the processing performed by the polymer design device 101 may be provided to the polymer design device 101 via the recording medium 209 such as a CD-ROM. The recording medium 209 stores a program (or programs) for implementing various processes according to the present embodiment, which will be described below, and the program(s) stored in the recording medium 209 is/are installed in the polymer design device 101 via the drive device 207. The installed program(s) is/are executable by the polymer design device 101. The recording medium 209 for storing the program(s) is not limited to the CD-ROM, but may be one or more non-transitory and tangible media that store data structure(s) readable by a computer. In addition to the CD-ROM, the computer-readable recording medium 209 may be a portable storage medium such as a DVD (Digital Versatile Disk) disk, a USB memory, or a semiconductor memory such as a flash memory.

[Functional Configuration Example of Polymer Design Device 101]

Figure 3:
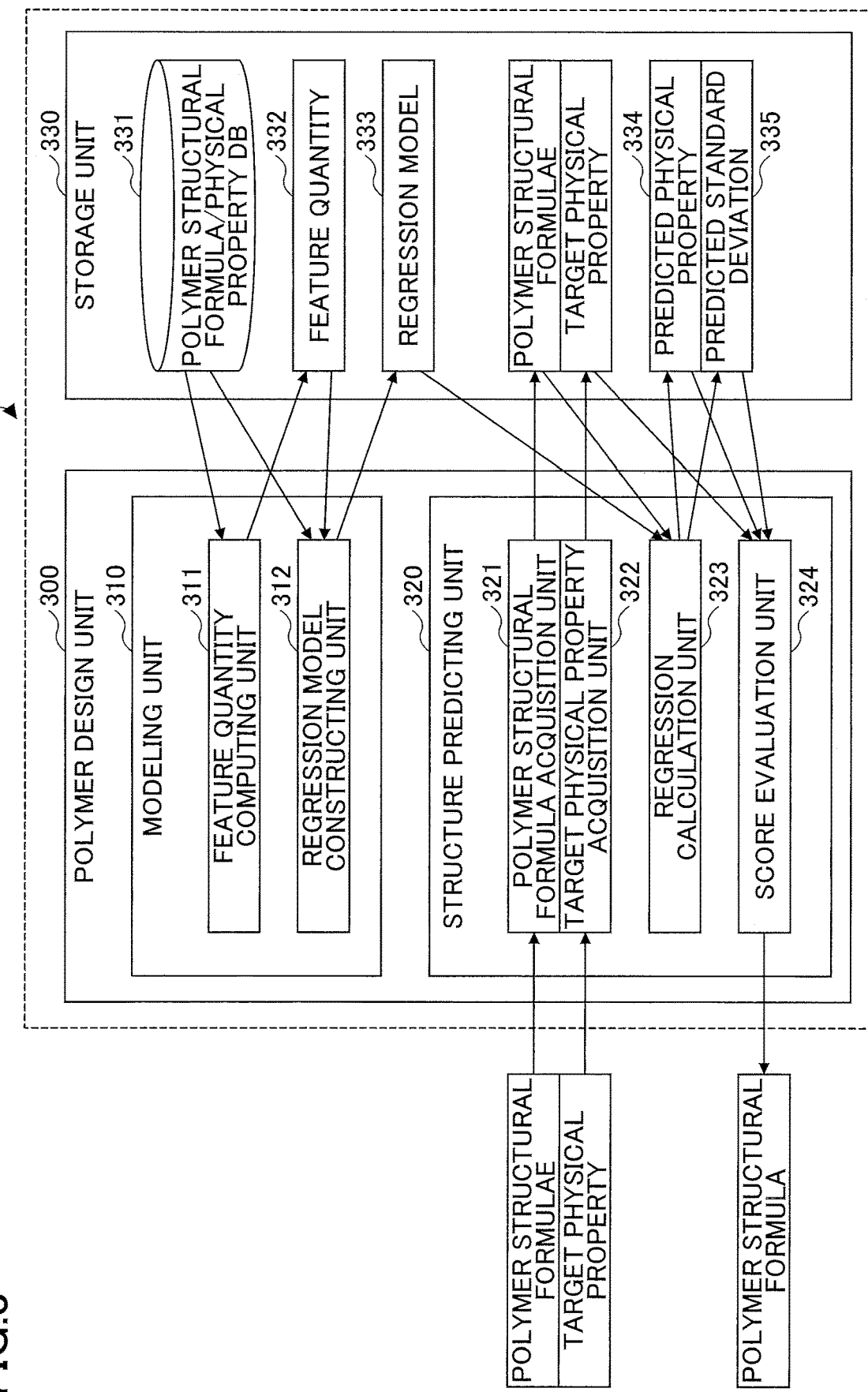
FIG. 3 is a diagram illustrating an example of the functional configuration of the polymer design device.

FIG. 3 is a diagram illustrating an example of a functional configuration of the polymer design device 101. In FIG. 3, the polymer design device 101 includes the polymer design unit 300. The polymer design unit 300 is realized by a corresponding program being executed by the CPU 201.

The storage unit 330 stores a polymer structural formula/physical property database (DB) 331, feature quantity 332, a regression model 333, a predicted physical property 334, a predicted standard deviation 335, and the like.

The polymer design unit 300 generates, by machine learning, a regression model for predicting the physical properties of a polymer structural formula specified by a user. In addition, the polymer design unit 300 predicts physical properties of multiple polymer structural formulae and standard deviations of the physical properties by using the generated regression model, and ranks the polymers in order to output the structural formula of the polymer to be verified next. The polymer design unit 300 includes a modeling unit 310 and a structure predicting unit 320 that together serve as a processing unit.

The modeling unit 310 calculates feature quantities of polymer structural formulae in the polymer structural formula/physical property DB 331, to define a regression model. The polymer structural formula/physical property DB 331 stores, for each polymer, a corresponding polymer structural formula and an experimental value of its physical property that has been obtained empirically. Using the polymer structural formula and the experimental value of the physical property stored in the polymer structural formula/physical property DB 331, a regression model (model having been trained by machine learning) is defined that involves input variables (feature quantities of a polymer structural formula) and output variables (a physical property value (mean value) of the polymer and its standard deviation). The polymer structural formula may be expressed in a predetermined form. In the present embodiment, a case in which the structural formula is described in accordance with simplified molecular-input line-entry system (SMILES) is described, but an applicable notation for describing a structural formula is not limited to SMILES notation. The modeling unit 310 includes a feature quantity computing unit 311 and a regression model constructing unit 312.

The feature quantity computing unit 311 acquires a structural formula of a polymer from the polymer structural formula/physical property DB 331, and calculates the feature quantity 332 from the obtained polymer structural formula. The calculated feature quantity 332 is stored in the storage unit 330. A feature quantity may be calculated from the polymer structural formula by utilizing a predetermined algorithm. For example, Extended-Connectivity Fingerprint (ECFP), molecular weight, log P, the number of alicyclic rings, the number of aromatic rings, and the number of heterocyclic rings may be used as a feature quantity. A value obtained by dividing the above-mentioned feature quantity by the number of constituent atoms of a repeating unit of the polymer may also be used as a feature quantity. As an example, the regression model can be obtained using a feature quantity obtained by dividing the ECFP by the number of constituent atoms of a repeating unit of the polymer.

The regression model constructing unit 312 constructs the regression model 333 (model having been trained by machine learning) by using feature quantities calculated from polymer structural formulae of polymers and experimental values of physical properties of the polymers. The regression model 333 is stored in the storage unit 330.

The regression model 333 obtained by the regression model constructing unit 312 may be expressed by the following set of formulas:

$$y\_mean = f(x), \text{ and}$$

$$y\_std = g(x),$$

where y_mean is a predicted average value (may simply be referred to as a predicted value) of a physical property. y_std is a standard deviation, and represents a degree of reliability in the prediction. By substituting a feature quantity for x, the predicted value y_mean of a physical property and a standard deviation y_std of the physical property (y_mean) are obtained. When a feature quantity of a structural formula of a polymer is input to the regression model 333, a mean (y_mean) and a standard deviation (y_std) of a physical property value of the polymer are output.

As a regression analysis for obtaining the regression model 333, a method that can calculate the predicted value and its standard deviation can be used. For example, Gaussian process regression, Bayesian ridge regression, ensemble regression, and deep learning are all applicable. As an example, a regression model can be obtained by using Gaussian process regression.

The structure predicting unit 320 includes a polymer structural formula acquisition unit 321, a target physical property acquisition unit 322, a regression calculation unit 323, and a score evaluation unit 324.

The polymer structural formula acquisition unit 321 acquires multiple polymer structural formulae designated by a user, and stores the polymer structural formulae into the storage unit 330. The polymer structural formula acquisition unit 321 may acquire the polymer structural formulae from another device (such as the terminal 102) via the network 103, or may acquire the polymer structural formulae by receiving a user's input of the polymer structural formulae through the input device or the like of the polymer design device 101. The designated polymer structural formulae may be expressed in accordance with SMILES or the like.

The target physical property acquisition unit 322 acquires a target physical property of a polymer, which is designated by the user, and stores the target physical property into the storage unit 330. In the present embodiment, a target physical property is information indicating a requirement for a value of a physical property (physical property value) of a polymer that the user wishes to design (or produce), hereinafter referred to as a "desired polymer". A target physical property may be a specific value of a physical property (physical property value) of a desired polymer. Alternatively, instead of designating a specific value, more abstract information may be designated as a target physical property. For example, types of conditions for physical properties of a polymer may be designated as the target physical property. In the present embodiment, in a case in which "maximization of physical property" is designated as a target physical property, the polymer design device 101 may search for a polymer having the largest physical property value, from among the structural formulae of the polymers acquired by the polymer structural formula acquisition unit 321. Conversely, in a case in which "minimization of physical property" is designated as a target physical property, the polymer design device 101 may search for a polymer having the smallest physical property value, from among the structural formulae of polymers acquired by the polymer structural formula acquisition unit 321. The target physical property acquisition unit 322 may acquire the target physical property by from another device (such as the terminal 102) via the network 103, or may acquire the target physical property in accordance with designation of the target physical property by the user through the input device of the polymer design device 101 or the like.

The regression calculation unit 323 estimates (predicts), in response to acquiring the multiple polymer structural formulae designated by the user, the predicted physical property values of the acquired polymer structural formulae and the standard deviations of the predicted physical property values by using the regression model 333 (a model having been trained by machine learning).

Specifically, the regression calculation unit 323 calculates a feature quantity of each of the polymer structural formulae obtained by the polymer structural formula acquisition unit 321. A feature quantity may be calculated based on a predetermined algorithm for calculating a feature quantity from a polymer structural formula. For example, an Extended Connectivity Fingerprint (ECFP), molecular weight, log P, the number of alicyclic rings, the number of aromatic rings, and the number of heterocyclic rings are all applicable. A value obtained by dividing the feature quantity by the number of constituent atoms of a repeating unit of the polymer may be used. As an example, a feature quantity calculated by dividing the ECFP by the number of constituent atoms of a repeating unit of the polymer can be used. The regression calculation unit 323 also predicts a physical property value (y_mean (predicted value (average) of a physical property)) and a standard deviation (y_std) of the physical property value based on the calculated feature quantity of the polymer structural formula, based on the regression model 333 stored in the storage unit 330. The predicted physical property 334 and the predicted standard deviation 335 are output to the storage unit 330.

Figure 4:
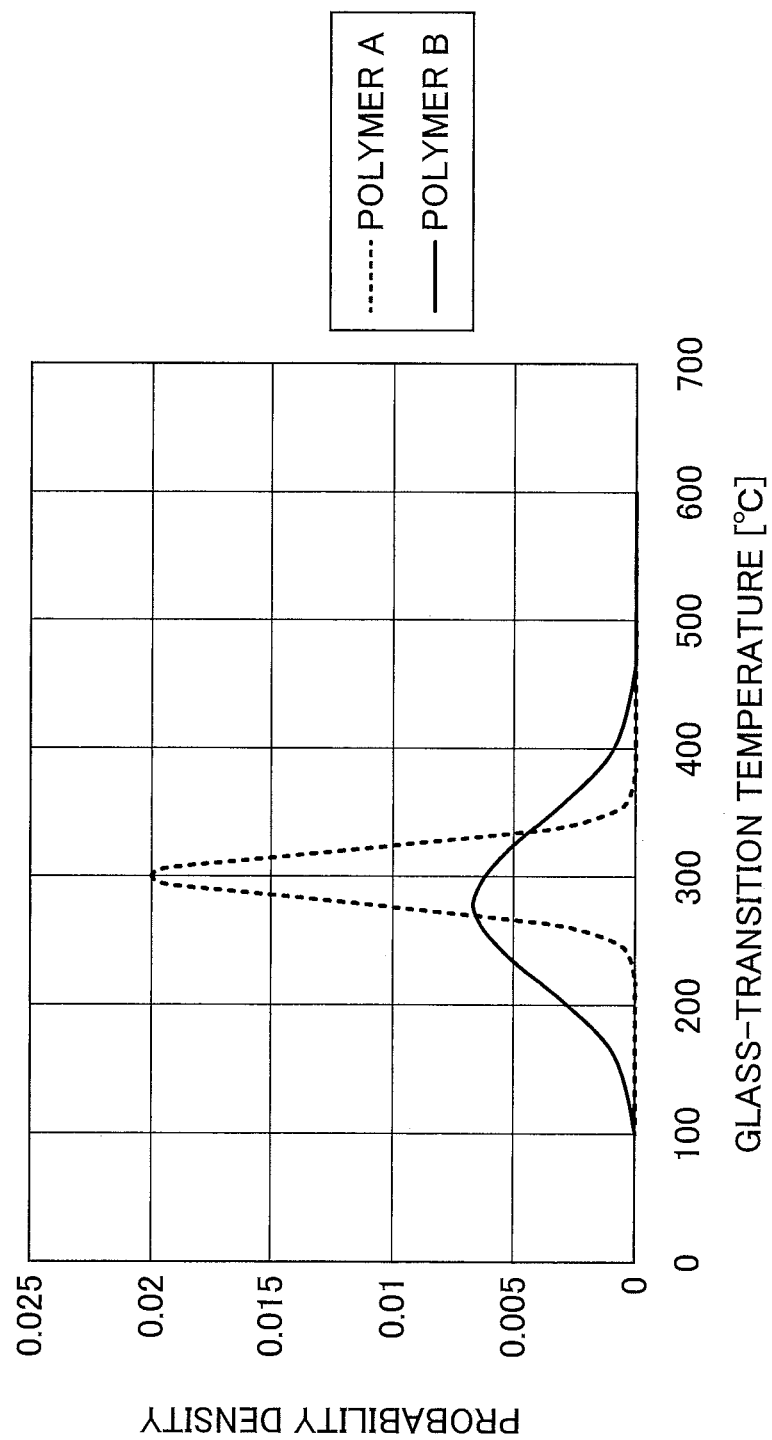
FIG. 4 is a diagram illustrating an example of a predicted physical property.

FIG. 4 is a diagram illustrating an example of a predicted physical property. The regression model 333 can output, as the predicted physical property of the polymer structural formula, a variable of the physical property following a certain probability distribution. In the present embodiment, a case in which the regression model 333 outputs a mean value (denoted by "y_mean") and a standard deviation (denoted by "y_std") of a normal distribution, as the predicted physical property of the polymer structural formula, will be described. FIG. 4 illustrates examples of a distribution of a certain physical property (glass transition temperature) following a normal distribution (probability distribution). In the present embodiment, a mean of a probability distribution (such as a normal distribution) for a certain physical property X of a certain polymer Y is referred to as a "predicted value (or predicted physical property value) of a physical property X of a polymer Y", and a standard deviation of the probability distribution for the physical property X of the polymer Y is referred to as a "standard deviation of a physical property X of a polymer Y". For example, suppose that, for the regression model 333, when a polymer structural formula A is input, the glass transition temperature A (300° C.±20° C.) is output, and when the polymer structural formula B is input, the glass transition temperature B (280° C.±60° C.) is output. With respect to the structural formula A, a predicted value (y_mean) is 300° C. and a standard deviation (y_std) is 20° C. With respect to the polymer structural formula B, the predicted value (y_mean) is 280° C. and a standard deviation (y_std) is 60° C.

Referring back to FIG. 3, the score evaluation unit 324 ranks the multiple obtained polymers by using predicted values and standard deviations of their physical properties. A method known as Bayesian optimization can be used as a method of ranking polymers. Bayesian optimization can perform evaluation by considering not only the predicted value (y_mean) but also the predicted standard deviation (y_std). That is, in the present embodiment, not only the predicted physical property value but also the standard deviation of the predicted physical property value may be considered. As a method of evaluation, Probability of improvement (PI), Expected value of improvement (EI), Upper Confidence Bound (UCB) and Lower Confidence Bound (LCB) can be used for example.

In a case in which maximization of a physical property is designated as a target physical property, the score evaluation unit 324 can rank the multiple obtained polymers by UCB. In UCB, a sum of a predicted physical property value and a value obtained by multiplying a standard deviation by a coefficient k is used as the score. The higher score represents the higher rank (i.e. the target physical property is satisfied). In the present embodiment, a case in which the coefficient k (to by multiplied by a standard deviation) is 1.96 will be explained, but the coefficient k is not limited to this value.

$$\text{Score} = y\_mean + k \times y\_std$$

Reasons for adding the predicted standard deviation to the predicted value will be explained below. For example, in the example of FIG. 4, Bayesian optimization determines "which polymer structure is most likely to have the highest glass transition temperature?" Although the predicted glass transition temperature of polymer structure A has a high average value, its distribution is narrow. Thus, considering a prediction error, the actual glass transition temperature might not be so high. On the other hand, although the predicted glass transition temperature of polymer structure B has a slightly lower average value, its distribution is wide. Thus, considering a prediction error, the actual glass transition temperature may be higher. Therefore, in a case in which maximization of a physical property is designated as a target physical property, the predicted standard deviation is added to the predicted value.

In contrast, in a case in which minimization of a physical property is designated as a target physical property, the score evaluation unit 324 can rank the multiple obtained polymers by LCB. In LCB, a value obtained by subtracting, from a predicted physical property value, a product of a standard deviation of a predicted physical property and a coefficient k, is used as the score. The lower score represents the higher rank (i.e. the target physical property is satisfied).

$$\text{Score} = y\_mean - k \times y\_std$$

As described above, in the present embodiment, polymers may be ranked by using not only their predicted physical property values (y_mean) but also standard deviations (y_std) of their physical properties. For example, when there are few data available for a training dataset on machine learning, or when predicting a property of a new polymer that differs from the training dataset, it is difficult to obtain a correct score from only predicted physical property values because accuracy of prediction of a regression model is low. As in the present embodiment, by taking the standard deviation into account, a score can be evaluated considering an error in a predicted value. Accordingly, more reliable score evaluation is realized as compared with a case of using only predicted physical property values.

The score evaluation unit 324 obtains a polymer structural formula having a high (or low) score as described above. The score evaluation unit 324 may obtain a single polymer, or more than one polymer. In a case in which a polymer structural formula is specified via the network 103, the polymer structural formula obtained by the score evaluation unit 324 is transmitted to the user's terminal 102 for display. In a case in which a polymer structural formula is specified by a user's input operation at the polymer design device 101, the polymer structural formula obtained by the score evaluation unit 324 is displayed on the display device of the polymer design device 101.

[Example of Data Structure of Polymer Structural Formula/Physical Property DB 331]

FIG. 5 is a diagram illustrating an example of a data structure of the polymer structural formula/physical property DB 331. In FIG. 5, the polymer structural formula/physical property DB 331 is a database that manages, for each polymer, a structural formula, experimental values of physical properties (such as a refractive index and a glass transition temperature), and the like. The polymer structural formula/physical property DB 331 includes items of a polymer name, a structural formula, a refractive index, a glass transition temperature, and the like.

The "polymer name" indicates information for identifying a polymer. The "structural formula" indicates a structural formula of the polymer. Although the structural formula is described in accordance with SMILES in FIG. 5, the notation of the structural formula is not limited to SMILES. The "refractive index", "glass transition temperature", and the like are examples of various physical properties of the polymer that are obtained empirically or via simulation. Experimental values or calculated values obtained via simulation are illustrated for each property name. In the example of FIG. 5, a repeating unit "*CC*" is associated with a polymer name "poly(ethylene)", a value "1.472" of a refractive index, and the like are illustrated. Similarly, with respect to other polymers, each physical property value is stored.

Data that the modeling unit 310 refers to, data generated the modeling unit 310, and the like, may be managed in a work table 400. The work table 400 is a table in which a calculated feature quantity is recorded for each polymer, and the work table 400 includes items of a polymer name, a structural formula, the number of atoms, ECFP, and the like. The "polymer name" refers to the polymer name registered in the polymer structural formula/physical property DB 331. The "number of atoms" and the "ECFP" indicate feature quantities obtained by the feature quantity computing unit 311. The feature quantities in the work table 400 and the physical properties in the polymer structural formula/physical property DB 331 are used for machine learning (regression analysis). Therefore, each record in the work table 400 may be associated with a corresponding record in the polymer structural formula/physical property DB 331, by using the polymer name as a key. The data structures of the polymer structural formula/physical property DB 331 and the data configuration example of the work table 400 illustrated in FIG. 4 are merely one example and are not limited to this example.

[Flowchart for Explaining Prediction Process]

Figure 6:
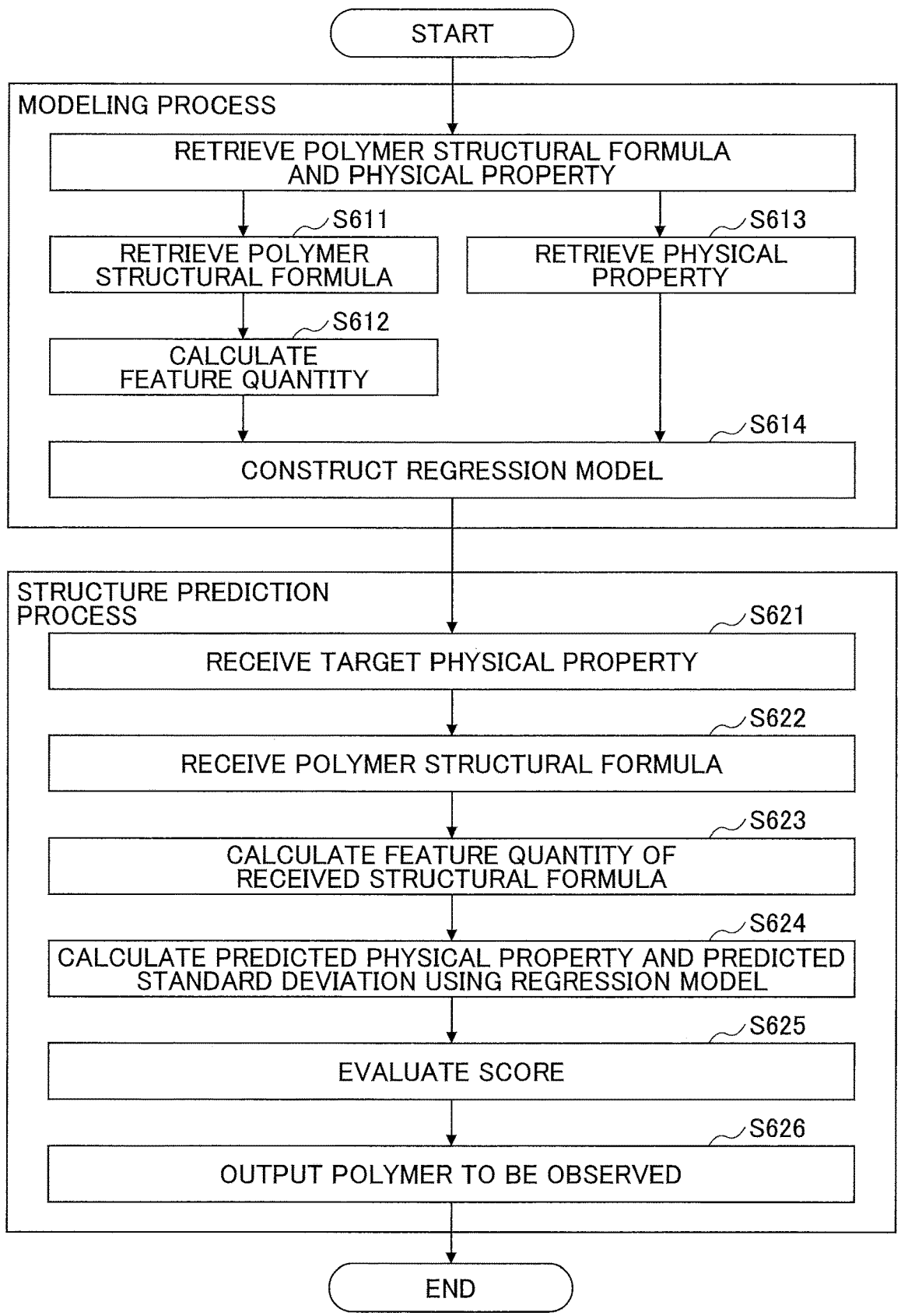
FIG. 6 is a flowchart illustrating a prediction process.

FIG. 6 is a flowchart illustrating a prediction process. The prediction process by the polymer design unit 300 is performed as illustrated in FIG. 6.

First, a modeling process is performed by the modeling unit 310.

In step 611 (S611), the feature quantity computing unit 311 in the modeling unit 310 retrieves structural formulae of polymers from the polymer structural formula/physical property DB 331.

In step 612 (S612), the feature quantity computing unit 311 calculates feature quantities of the structural formulae of the polymers retrieved in S611.

In step 613 (S613), the regression model constructing unit 312 acquires, from the polymer structural formula/physical property DB 331, physical property values corresponding to the structural formulae of the polymers retrieved in S611. It should be noted that S613 may be performed before S611 or simultaneously with S611.

In step 614 (S614), the regression model constructing unit 312 determines the above-described regression models f(x) and g(x) involving the feature quantity (obtained in S612) as an independent variable x, and involving the physical property value (obtained in S613) as a dependent variable y. The regression model determined in S614 is stored in the storage unit 330.

Thereafter, a structure prediction process is performed by the structure predicting unit 320.

In step 621 (S621), the target physical property acquisition unit 322 receives the target physical property from a user. The target physical property is stored in the storage unit 330.

In step 622 (S622), the polymer structural formula acquisition unit 321 receives multiple polymer structural formulae from the user. The received polymer structural formulae are stored in the storage unit 330. It should be noted that S622 may be performed before S621 or simultaneously with S621.

In step 623 (S623), the regression calculation unit 323 calculates the feature quantities of the polymer structural formulae received in S622. The feature quantities can be obtained by performing the same process as S612 in the modeling process.

In step 624 (S624), the regression calculation unit 323 calculates the predicted physical property values and the predicted standard deviations of the polymers (corresponding to the polymer structural formulae received in S622), by using the feature quantities obtained in step S623 and the regression model obtained in S614. The obtained physical property values and standard deviations are stored in the storage unit 330.

In step 625 (S625), the score evaluation unit 324 ranks the polymers (polymer structural formulae received in S622) by calculating scores of the polymers based on the physical property values and the standard deviations obtained in S624.

In step 626 (S626), the score evaluation unit 324 selects a polymer of the highest rank as a candidate of a polymer to be verified next, and transmits the structural formula of the polymer to the user's terminal 102 for display. One or more polymers may be identified as candidate polymers. In addition, information transmitted to the user's terminal 102 is not required to be the structural formula of the polymer. Any information suitable for identifying the selected polymer may be transmitted to the user's terminal 102. Where the polymer structural formulae are specified through the user's operation at the polymer design device 101, the resulting polymer structure is displayed on the display device of the polymer design device 101.

As will be described below, the inventors have evaluated a method of predicting a polymer structural formula according to the present embodiment and some variations of the method. In the evaluation, the number of attempts required for predicting (identifying) a desired polymer structural formula is measured. According to the evaluation, the method according to the present embodiment could predict a desired polymer structural formula with the fewest attempts.

Example 1

Figure 7:
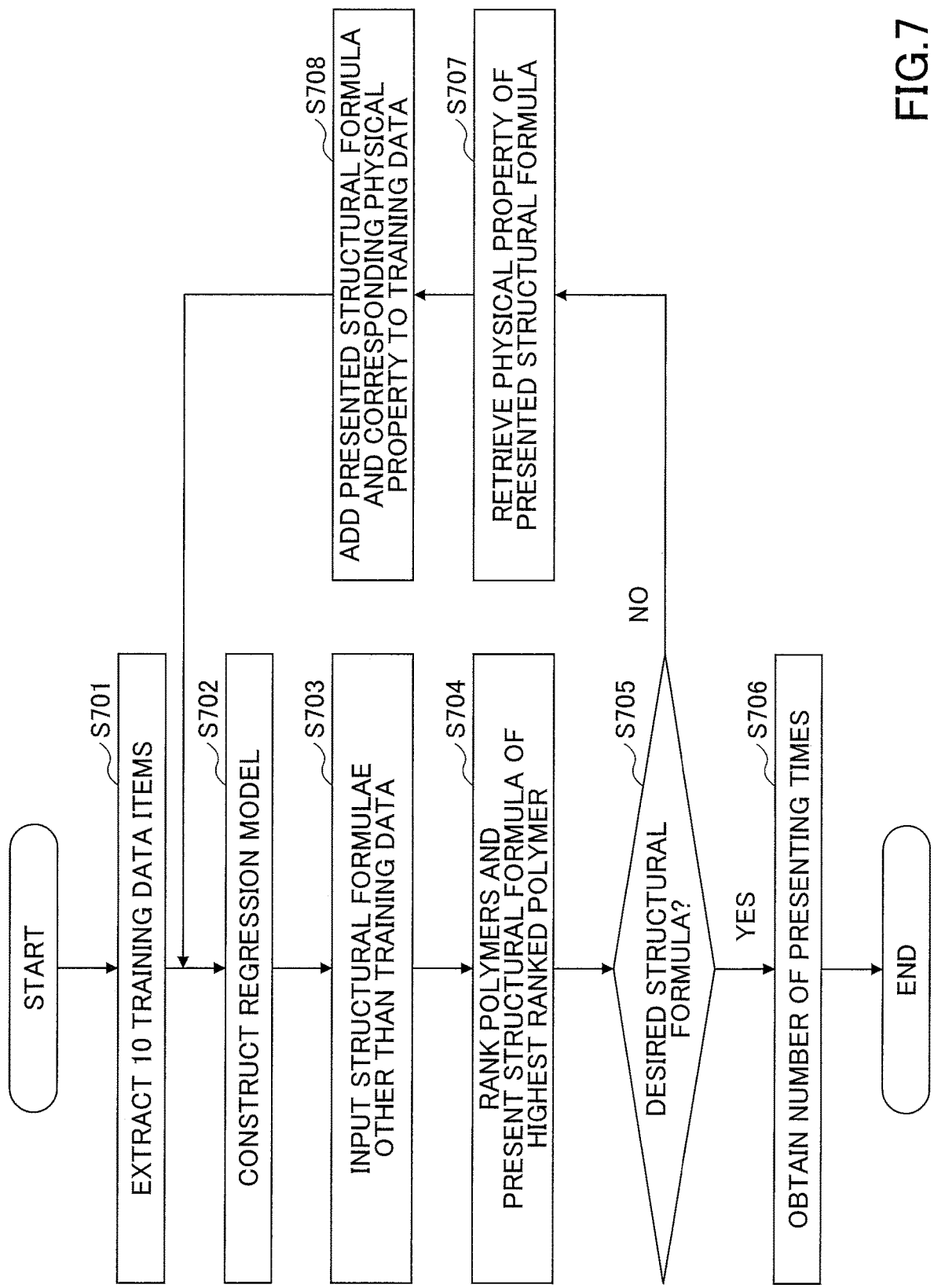
FIG. 7 is a flowchart illustrating a method of evaluating the number of trials required for finding a desired polymer, the method being performed by using the polymer design device.

In Example 1, performance of the method of predicting a polymer structural formula according to the present embodiment was evaluated by performing a test process illustrated in FIG. 7, using the polymer design device 101. Before performing the test process, 417 sets of data, each of which includes a structural formula of a polymer and a glass transition temperature value (which is an example of a physical property value) of the polymer, were prepared in advance. In the following, the 417 sets of data are referred to as an evaluation dataset. In the test process, a test for selecting a polymer having the highest glass transition temperature from the evaluation dataset was performed (that is, a target physical property in the test is maximization of glass transition temperature).

A flow of the test process illustrated in FIG. 7 will be explained below.

In Step 701 (S701), from among the evaluation dataset (the aforementioned 417 sets of data), 10 sets of data are randomly selected, and are stored in the polymer structural formula/physical property DB 331 of the storage unit 330 of the polymer design device 101. The data (10 sets of data) selected in S701 is referred to as "training dataset".

In step 702 (S702), a regression model is generated by the modeling unit 310 according to the present embodiment based on the training dataset selected in S701.

In step 703 (S703), structural formulae of the polymers in the evaluation dataset (except for the training dataset selected in S701) are input to the polymer structural formula acquisition unit 321.

In step 704 (S704), a predicted value (a mean value and a standard deviation) of a glass transition temperature for each polymer structural formula input in S703 (i.e., the polymer structural formulae in the evaluation dataset other than the training dataset selected in S701) is estimated (predicted) by using the regression model obtained in S702. Also, for each polymer structural formula (input in S703), a score is calculated based on the predicted value of the glass transition temperature (the mean value and the standard deviation), and the polymers are ranked based on the calculated scores. After the calculation of the score, a polymer structural formula having the best score is selected and presented (e.g. displayed on the display device of to the terminal 102) as a candidate for next verification.

In step 705 (S705), a determination as to whether the polymer presented in S704 is a desired polymer (polymer satisfying the target physical property, i.e., the polymer with the highest glass transition temperature in the evaluation dataset [except for the training dataset]) is made. If the polymer presented in S704 is a desired polymer, the test process proceeds to step 706. If the polymer presented in S704 is not a desired polymer, the test process proceeds step 707.

In step 706 (S706), the number of structural formulae that have been presented until a desired polymer was found is acquired (the number may also be referred to as "the number of trials"), and the test process terminates.

In step 707 (S707), a glass transition temperature value corresponding to the polymer structural formula presented in S704 is retrieved from the evaluation dataset.

In step 708 (S708), the glass transition temperature value retrieved in S707 and data of the polymer structural formula corresponding to the glass transition temperature value are stored in the polymer structural formula/physical property DB 331. After S708, the test process reverts to the step of constructing a regression model (S702) again. The above steps (S702 to S705) are carried out until the desired polymer structural formula is presented.

A result of the above-described test process depends on the training dataset that is randomly selected at the first step (S701). To eliminate dependence on the training dataset initially selected, the test process was performed 500 times in Example 1 (also in Examples 2, 3, 4, and Comparative Example to be described below). An average value of the number of trials, obtained by performing the test process 500 times, is referred to as a "mean trial count". The mean trial count is used as a performance indicator for a method of predicting a polymer structural formula, in comparing performance of each of the methods in Example 1, 2, 3, 4, and Comparative Example. The smaller the mean trial count is, the higher the performance of the method of predicting a polymer structural formula is.

Example 2

In Example 2, a test process similar to that described in Example 1 was performed. However, Example 2 differs from Example 1 in that calculation of the score in the above-described S704 is performed without using the standard deviation. Except for the above-mentioned score calculation method, the test process in Example 2 was performed in a similar manner to that in Example 1, and the mean trial count required for presenting a desired polymer structural formula was calculated.

Example 3

Example 3 differs from Example 1 in that reduction of feature quantities is performed when creating a regression model in the above-described S702. In Example 3, after feature quantities are reduced, the regression model is created. In order to reduce feature quantities, Lasso is used. That is, after constructing a regression model using feature quantities and glass transition temperatures, any term having a zero coefficient is excluded from an expression of the regression model. A hyperparameter used at this time was determined by cross-validation. After the reduction of feature quantities, the regression model was constructed using Gaussian process regression as in Example 1 after the feature size was reduced. Except for the above-mentioned point (method of creating the regression model), the test process in Example 3 was performed in a similar manner to that in Example 1, and the mean trial count required for presenting a desired polymer structural formula was calculated.

Example 4

In Example 4, a test process similar to that described in Example 3 was performed. Example 4 differs from Example 3 in that the score is calculated without using the standard deviation. Except for the point (score calculation method), the test process in Example 4 was performed in a similar manner to that in Example 3, and the mean trial count required for presenting a desired polymer structural formula was calculated.

Comparative Example

In Comparative Example, a test process similar to that described in Example 1 was performed. However, in Comparative Example, the polymers were not ranked in the above-described S704, and a polymer structural formula was randomly selected and presented. Except for this point, the test process in Comparative Example was performed in a similar manner to that in Example 1, and the mean trial count required for presenting a desired polymer structural formula was calculated.

FIG. 8 is a diagram illustrating an example of the evaluation results. FIG. 8 illustrates the evaluation result of performing the test process in each of Comparative Example, Example 1, Example 2, Example 3, and Example 4. The evaluation result indicates a mean trial count required for presenting a desired polymer structural formula in each of Comparative Example, Example 1, Example 2, Example 3, and Example 4. The mean trial count in Comparative Example, Example 2, Example 3, and Example 4 were 198, 24, 16, and 17, respectively. In contrast, the mean trial count in Example was very small, 4.6. A smaller mean trial count indicates that the desired polymer structural formula could be presented more efficiently. Accordingly, the above-described evaluation results indicate that the method of predicting a polymer structural formula in Example 1 (present embodiment) can design a desired polymer most efficiently. Thus, according to the present embodiment, a desired polymer structural formula can be presented through fewer trials.

As described above, according to the present embodiment of the present disclosure, by employing a predictive model that is constructed by learning the correlation between a feature quantity, calculated from a structural formula of a polymer, and the physical property of the polymer, and by applying Bayesian optimization to a solution of an inverse problem, the structural formula of a polymer having a desired physical property can be determined over fewer trials.

According to the embodiment of the present disclosure, as a polymer having a desired physical property can be determined over fewer trials, the time required for research and development of the polymer can be shortened.

It should be noted that the present invention is not limited to the above-described configurations, such as the configurations described in the above-described embodiments, and the configurations illustrated in the above-described configurations, such as combinations with other elements. In these respects, changes can be made without departing from the gist of the present invention, and can be appropriately determined in accordance with the application form.

What is claimed is:

1. A polymer design device comprising:
a processor that is configured to:
receive a requirement for a target physical property of a desired polymer;
acquire structural information of polymers; and
estimate, for each polymer corresponding to the structural information acquired by the polymer structural formula acquisition unit, physical property information of the polymer indicating a physical property of the polymer, based on the structural information of the polymer and based on a regression model representing a relationship between the structural information of the polymer and the physical property of the polymer, the physical property being a variable following a given probability distribution, and the physical property information including a mean value of the given probability distribution and a standard deviation of the given probability distribution; and
wherein the processor is further configured to:
calculate, for each polymer corresponding to the structural information acquired by the polymer structural formula acquisition unit, a score of the polymer based on the requirement for the target physical property and based on the mean value and the standard deviation of the physical property of the polymer,
rank the polymers acquired by the processor based on the score of each of the polymers, and select, from among the structural information of the polymers acquired by the processor, at least one polymer as the desired polymer, based on the score of each of the polymers, and
output information of only the selected at least one polymer, thereby reducing number of trials of finding structural information of a polymer that has the target physical property.

2. The polymer design device according to claim 1, wherein the given probability distribution is a normal distribution.

3. The polymer design device according to claim 1, the processor is further configured to:
calculate a feature quantity of a polymer from the structural information of the polymer; and
construct the regression model by performing a regression analysis to estimate the relationship between the feature quantity of the polymer and the physical property of the polymer.

4. The polymer design device according to claim 3, wherein the regression analysis is Gaussian process regression, Bayesian ridge regression, ensemble regression, or deep learning.

5. The polymer design device according to claim 3, wherein the processor is configured to calculate as the feature quantity of the polymer, from the structural information of the polymer based on a predetermined algorithm,
an Extended Connectivity Fingerprint (ECFP),
molecular weight,
log P,
a number of alicyclic rings,
a number of aromatic rings, a number of heterocyclic rings,
a quotient of the ECFP divided by a number of constituent atoms of a repeating unit of the polymer,
a quotient of the molecular weight divided by the number of the constituent atoms of the repeating unit of the polymer,
a quotient of the log P divided by the number of the constituent atoms of the repeating unit of the polymer,
a quotient of the number of alicyclic rings divided by the number of the constituent atoms of the repeating unit of the polymer,
a quotient of the number of aromatic rings divided by the number of the constituent atoms of the repeating unit of the polymer, or
a quotient of the number of heterocyclic rings divided by the number of the constituent atoms of the repeating unit of the polymer.

6. The polymer design device according to claim 1, wherein the processor is configured to calculate the score by adding the standard deviation to the mean value, in response to receiving the requirement for the target physical property indicating maximization of a physical property.

7. The polymer design device according to claim 1, wherein the processor is configured to calculate the score by subtracting the standard deviation from the mean value, in response to receiving the requirement for the target physical property indicating minimization of a physical property.

8. A non-transitory recording medium storing a computer program to cause a computer to perform a method comprising:
receiving a requirement for a target physical property of a desired polymer;
acquiring structural information of polymers;
estimating, for each polymer corresponding to the acquired structural information, physical property information of the polymer indicating a physical property of the polymer, based on the structural information of the polymer and based on a regression model representing a relationship between the structural information of the polymer and the physical property of the polymer, the physical property being a variable following a given probability distribution, and the physical property information including a mean value of the given probability distribution and a standard deviation of the given probability distribution;
calculating, for each polymer corresponding to the acquired structural information, a score of the polymer based on the requirement for the target physical property and based on the mean value and the standard deviation of the physical property of the polymer;
ranking the polymers acquired by the processor based on the score of each of the polymers, and selecting, from among the structural information of the polymers acquired by the acquiring, at least one polymer as the desired polymer, based on the score of each of the polymers; and
outputting information of only the selected at least one polymer, thereby reducing number of trials of finding structural information of a polymer that has the target physical property.

9. A method performed by a computer comprising:
receiving a requirement for a target physical property of a desired polymer;
acquiring structural information of polymers;
estimating, for each polymer corresponding to the acquired structural information, physical property information of the polymer indicating a physical property of the polymer, based on the structural information of the polymer and based on a regression model representing a relationship between the structural information of the polymer and the physical property of the polymer, the physical property being a variable following a given probability distribution, and the physical property information including a mean value of the given probability distribution and a standard deviation of the given probability distribution;

calculating, for each polymers corresponding to the acquired structural information, a score of the polymer based on the requirement for the target physical property and based on the mean value and the standard deviation of the physical property of the polymer;

ranking the polymers acquired by the processor based on the score of each of the polymers, and selecting, from among the structural information of the polymers acquired by the acquiring, at least one polymer as the desired polymer, based on the score of each of the polymers; and outputting information of only the selected at least one polymer, thereby reducing number of trials of finding structural information of a polymer that has the target physical property.

10. The polymer design device according to claim 1, wherein the processor is further configured to train the regression model using the calculated feature quantity of the polymer and the physical property of the polymer that is obtained from experiments.

\* \* \* \* \*